Dec. 19, 1944.         S. J. MURCEK                2,365,580
                   CEILING LEVEL MONITOR
                   Filed Jan. 28, 1943           2 Sheets-Sheet 1
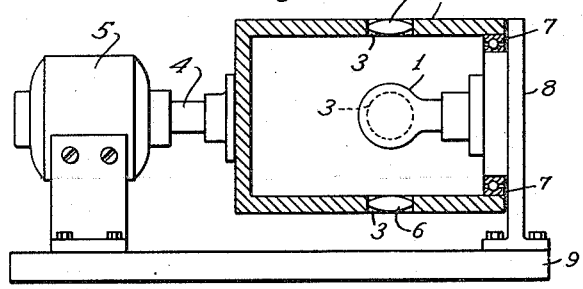
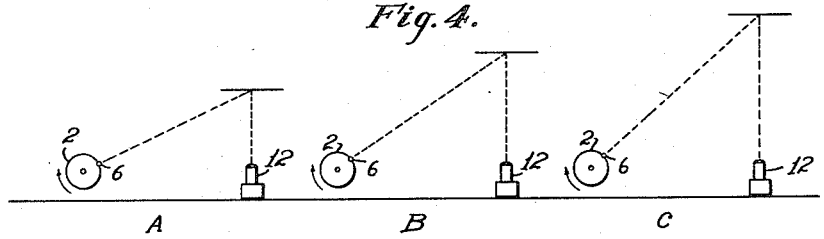
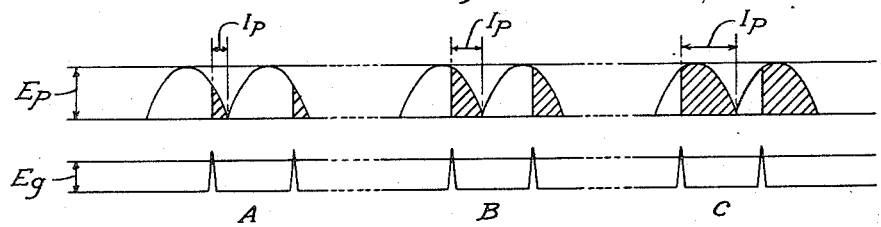
WITNESSES:                              INVENTOR
                                     Slavo J. Murcek.
                                        BY
                                              ATTORNEY Dec. 19, 1944.　　　　S. J. MURCEK　　　　2,365,580
CEILING LEVEL MONITOR
Filed Jan. 28, 1943　　　　2 Sheets-Sheet 2
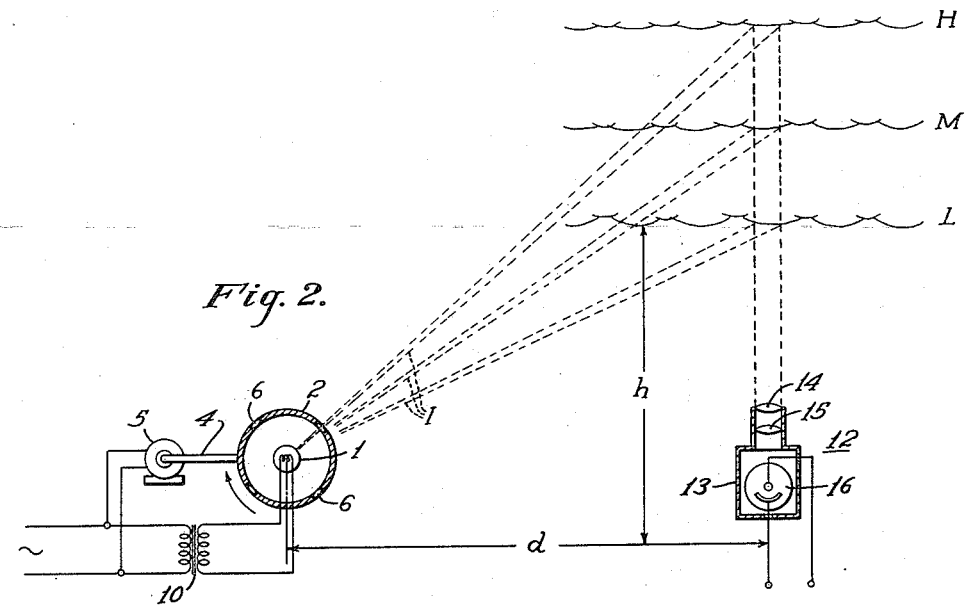
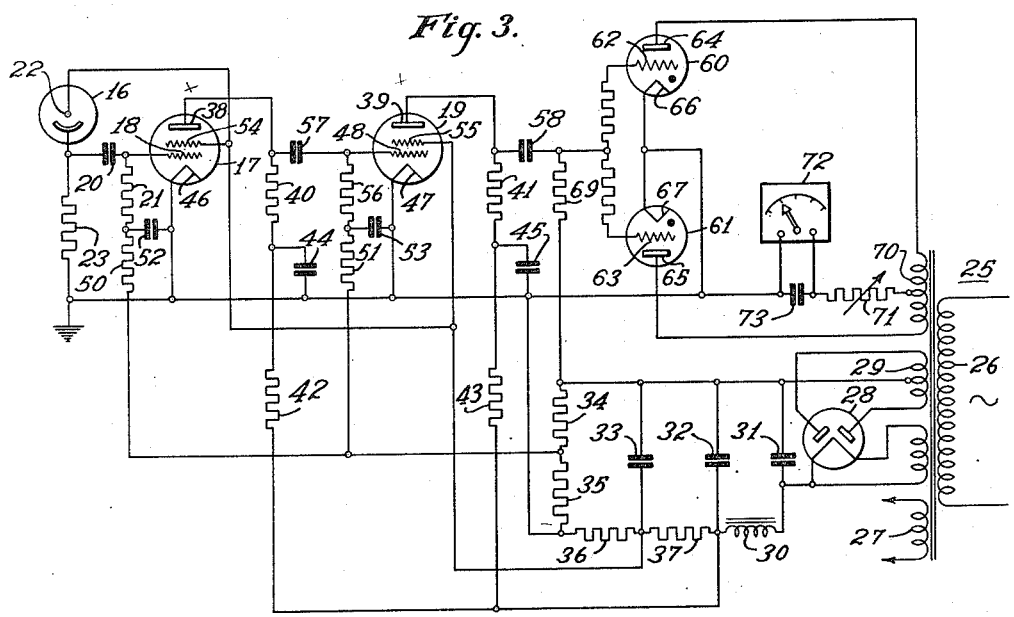
WITNESSES:
Edward M. Michaels
F. J. Barthol
INVENTOR
Slavo J. Murcek.
BY
F. W. Lyle.
ATTORNEY

UNITED STATES PATENT OFFICE 2,365,580

CEILING LEVEL MONITOR

Slavo J. Murcek, Duquesne, Pa., assignor to Westinghouse Electric & Manufacturing Company, East Pittsburgh, Pa., a corporation of Pennsylvania Application January 28, 1943, Serial No. 473,841

6 Claims. (Cl. 33—71)

This invention relates to an apparatus for indicating the distance of an object having light reflective properties from a chosen fixed point continuously and automatically over any period of time. More particularly, it relates to the continuous indication of the height of the natural ceiling formed by cloud or fog banks over a given point.

A particular feature of this invention is that when applied to ceiling level determination it will automatically indicate the relative height of the ceiling throughout the day and night without need of computation by the observer.

Another important feature of the invention is that variations of ceiling height may be directly indicated in any desired unit of measure within wide limits of variation in height and at a location remote from the point of measurement.

A particular advantage of the system for indicating the ceiling level is its simplicity of operation and compactness of the apparatus which permits installation at remote locations and the indication at any distant point therefrom.

A further advantage of the invention in its above intended application is that a continuous record may be had of variation in ceiling level for any length of time without any attention being needed for the apparatus. In this manner it may serve as an important aid in weather observation.

Other objects and advantages will be apparent from the following description of the invention, pointed out in particularity by the appended claims and taken in connection with the accompanying drawings, in which:

Figure 1 is a side elevational view of the light source and beam projector portion of the apparatus.

Fig. 2 is a schematic representation of the basic components of the invention applied to indicate the height of the natural ceiling.

Fig. 3 is a schematic circuit diagram of the electronic portion converting the varying light effects into electrical variations, and Fig. 4 in combination with Fig. 5 represents schematically the relation between various ceiling levels and current flow in the output circuit of the electronic system of Fig. 3.

The system herein described provides a coordination between reflected light impulses with an electric current of a predetermined frequency in certain phase relation in such manner that the cyclic time between the occurrence of the light impulses and the cyclic variation of the frequency is resolved into a function of the distance from which light reflection is obtained. This principle of operation is adaptable for a variety of applications for measuring the distance of any object from a given point as long as the object has the property of reflecting incident light. For the purpose of illustration and explanation, the system will be described as applied to the indication of the natural ceiling formed by clouds or fog, the height of which varies within certain time intervals. In this application, the invention finds particular utility in that by the simple means employed a direct observation of the ceiling level may be obtained throughout the day. This is particularly important for guiding airplanes to their destination and contributes greatly to their safe landing.

In determining ceiling levels, use has already been made of the triangulation principle employing a plurality of light beams and computing the effective height by the angle of these beams directed at a certain spot. During daylight hours in order to effect measurements by this method of aerial surveying, a pilot balloon had to be used and searchlights could only be employed at night. This and other prior methods are cumbersome, lengthy and require the almost constant attention of the attending observer. The present system in contradistinction therewith employs electrical integration of the ceiling altitude triangulation and photoelectric observation of the ceiling light.

In its basic form, the invention utilizes a beam of light which is directed to sweep the object, the distance of which is to be determined, at definite recurrent intervals in unit time. The reflected light impulses are received by means of a photoelectric device and compared with a predetermined constant frequency in an electrical circuit in which current conductivity is a function of the time phase relation between received impulses and the constant frequency.

In the embodiment shown for illustrating the practical application of the invention the system includes a revolving light source and a stationary photo-electric receiver. While this arrangement has certain practical advantages it is not to be considered as a limitation in that satisfactory results can be obtained also when the light source is chosen to be stationary and the photo-electric receiver is caused to revolve to produce periodic impulses due to the light reflected from the object illuminated by a stationary light source.

Referring to the drawings, in Fig. 1 the light source 1 shown here as an incandescent lamp is placed in the center of a revolving drum 2 which has four light apertures, oriented at equal spaces around the drum 2. The latter is arranged to rotate with the shaft 4 which is driven by a synchronous motor 5. In the apertures 3 are placed convex lenses 6 so situated that each transmits a tight beam of focused light from the lamp 1.

The drum 2 is also supported in a ball bearing 7 mounted around the support 8 which holds the lamp 1. The complete assembly may be mounted on a base 9 in proper alignment to assure balance in the rotation of the drum 2.

The application of the light source and projector for the indicator system is shown schematically in Fig. 2. The motor 5 is connected to a source of alternating current which also supplies through a transformer 10 the filament of the light 1. The drum 2 is shown in cross section in a front elevational view placed at a known distance $d$ from a light receiving device 12. The latter consists of a housing 13 having an extended portion in which a pair of lenses 14 and 15 are so arranged as to project an image onto the photocell 16 placed within the housing 13. The housing 13 is so mounted as to intercept a reflected light which falls perpendicularly from the natural ceiling to ground. Above the receiving device 12 are shown, by way of example, various layers of cloud banks which reflect the light onto the photocell 16. It is seen that if the drum 2 is rotated at a constant speed at each complete revolution thereof four separate and distinct beams of light will sweep across the overcast or cloud layer. In effect, for each revolution of the drum 2 four distinct spots of light sweep across the cloud layer and above the light receiver 12 in which the photocell 16 is housed. Assuming that the drum is driven by the synchronous motor 5 at a constant speed of 1800 revolutions per minute or 30 revolutions per second, the light spots will travel across the cloud ceiling at the rate of 120 flashes per second. If we assume that the drum 2 is rotating clockwise as shown by the arrow, the spots of light will travel in a left to right progression. In a practical arrangement, the focal distance of the light source 1 to the lens 6 may be so chosen as to cause a distinct lamp image to be projected at a distance of about 4000 feet. The condensing lenses 14 and 15 of the housing 13 are so oriented that only a portion of the travelling or scanning light spot is focused on the photocell 16. The dotted lines show the travelling beam as being reflected from three cloud layers at arbitrarily chosen heights for the purpose of illustrating the effect of reflection from different levels on the light receiver 12. Taking any of the three beams it will be readily seen that an optical triangulation is provided for the observation of the ceiling altitude, the height being one side of the triangle, the base being formed by the distance between the light source and the receiver 12, whereas the hypotenuse is formed by the projected beam. Observing the various layers, it is evident that an increase in the height of the cloud ceiling causes light therefrom to impinge earlier on the photocell 16 than from a lower ceiling level, with respect to the cyclic time of recurrent sweeps of the beam produced by the revolving drum 2. In other words, starting with the drum 2 at any point where the reflected light does not fall on the photocell if the ceiling height is the one shown by the cloud bank marked H, the light bear marked by I will be reflected earlier in time than the same beam when it is reflected from the cloud bank indicated by M. In the same manner taking the lowest level shown by L of the cloud bank, the reflection will occur later in the cyclic time of the revolution of the drum 2 than from the medium bank marked M. Briefly, a phase difference appears between light impulses on the photo-tube from a high ceiling with respect to light impulses from a low ceiling.

It is a well known fact that in the operation of photo-electric cells an increase of illumination will result in an increase of current conductivity. In the particular case herein shown, the conductivity of the photo-electric cell 16 will increase momentarily 120 times per second. This is an important fact and should be borne in mind when considering the operation of the system with reference to the electrical circuit provided for converting the light impulses received by the photocell into an electric current which in its magnitude bears a definite relation to the height of the reflecting cloud layer.

The electrical circuit of the indicator system is shown in Fig. 3 comprising a conventional two-stage vacuum tube amplifier which in its output circuit employs a pair of electron discharge devices of the gaseous conducting type. The photo-electric cell 16 is shown connected in the amplifier input to the grid 18 of the amplifier tube 17, through a conventional resistance-capacity coupling arrangement, including as elements the coupling capacity 20 and the grid input resistor 21. The anode 22 of the photocell 16 as well as the various electrodes of the amplifier tubes are supplied with proper operating potentials from a common rectifier power supply. The latter includes the power transformer 25, having a primary winding 26 which connects to the same supply source as is used for the energization of the motor 5. The secondary winding 27 may be connected to the heater circuit of the various tubes employed in the conventional manner. This connection is omitted for the sake of simplicity of illustration. A rectifier tube 28 is employed to rectify the current from the secondary winding 29 and a conventional filter system comprising the reactor 30 and capacitors 31, 32 and 33 is connected to the output of the rectifier and supplies a voltage divider network comprising the resistors 34, 35, 36 and 37. The positive terminal of the power supply connects to the anodes 38 and 39 of the amplifying tubes 17 and 19 in series with proper load resistors 40 and 41, respectively, and additional filter resistors 42 and 43 bypassed by the condensers 44 and 45, respectively.

The voltage amplifying stages are identical, both employing high gain amplifier tubes 17 and 19. The cathodes 46 and 47 return to ground potential. Bias supply for the grid electrodes 18 and 48 is derived from a tap of the voltage divider resistors through a filter network comprising resistors 50 and 51 bypassed by condensers 52 and 53, respectively. The screen grid electrodes 54 and 55 of these tubes return to a suitable tap on the voltage divider between resistors 36 and 37. Coupling between the amplifying stages is provided by the coupling condenser 57 connected from the anode 38 of tube 17 to grid 48 of the succeeding tube 19, whereas the output of the latter is applied through the coupling condenser 58 to the input circuit of the output stage.

The electron discharge devices 60 and 61 in the output stage are of the gaseous conduction type which is indicated by the dot placed within the circle representing the envelope of the tube. Discharge tubes of this type possess the characteristic that their grid electrode functions solely to initiate current conductivity between anode and cathode, when certain predetermined operating voltage values are maintained. Once conductivity is established, the grid loses its control function as long as the anode-cathode potential of the tube is of sufficient value to maintain conductivity. Once current ceases, the blocking action of the grid is again effective until potential changes on the grid establish current conductivity. Tubes of this type are also known in the art as "thyratrons." In the circuit herein shown, there is a common input between the grids 62 and 63 of the tubes 60 and 61 and the grid circuit returns through the common grid load resistor 69 to the highest negative point on the voltage divider whereby the voltage drop across the resistors 34 and 35 is impressed between grids 62 and 63 and cathodes 66 and 67 connected together to ground.

The output circuit of the discharge tubes 60 and 61 between anodes 64 and 65 and the interconnected cathodes 66 and 67 includes the center tapped secondary winding 70 of the power transformer 25. In series between the center tap of the winding 70 and the cathodes 66 and 67 is placed the adjustable load resistor 71 and a current indicating meter 72, the terminals of which are bypassed by a capacitor 73. The anode 64 connects to one terminal of the winding 70, whereas the anode 65 to the other terminal. In this manner the instantaneous voltage applied to one anode is 180° out of phase with that applied to the other anode. Consequently, at one-half cycle of the alternating current supply the polarity of the anode supply voltage will be positive at the anode with respect to the cathode of one of the tubes 60 or 61 and of negative polarity in the other. Since current conductivity can be established only if the anode of the tube is positive with respect to the cathode, it follows that the discharge tube 60 will conduct current at one half cycle and the tube 61 at the other half cycle of the supply voltage. This function is important with respect to the operation of the entire system and will be explained in greater detail later.

Referring to the operation of the sytem, it should be recalled that the uniform and continuous rotation of the drum 2 will produce recurrent sweeps of the ceiling in uniform time intervals at the spot on which the photocell 16 is focused. The speed of the motor 5 is so chosen that a momentary light impulse shall occur exery 1/120 of a second. Assuming that the alternating-current power supply is of the conventional 60 cycle type, there will be a light impulse reaching the photocell 16 at every half cycle of the alternating-current power supply frequency. Since the motor 5 is of the synchronous type, the speed thereof is held constant and is governed by the supply frequency which also supplies anode potential to the discharge tubes 60 and 61 as mentioned before. Obviously there is a synchronism between the rotating drum 2 and the anode voltage reversals of the discharge tubes 60 and 61. This synchronism or coordination between light impulses and anode supply variations on the output tubes 60 and 61 is the salient point of the indicating system. It is essential that the start of the sine wave voltage input between cathodes and anodes of the discharge tubes shall occur when one of the projecting lenses 6 of the drum is in a position perpendicular to the axis of the rotating drum. Before the system starts into operation, this can easily be accomplished by adjusting the position of the drum on the motor shaft.

Observing Fig. 2, it will be noted that if the drum 2 is in such position that the projected beam is perpendicular to the axis, no reflection of the light will reach the photocell 16, since both the projected beam and the direction of the receiver for the photocell form parallel lines which meet in infinity. This condition would be the indication of an infinitely high ceiling level. A light impulse at that instant would coincide with zero voltage between the anodes and cathodes of each of the discharge tubes 60 and 61. Assuming that at that instant the alternating-current voltage wave is at the zero potential point, starting from said relationship, the system is set into operation and each recurring position of one of the lenses 6 will thereafter be perpendicular to the axis when the voltage wave supplied to the anodes 64 and 65 is zero.

As the light beam projected from the drum 2 sweeps over the sky at some position, there will be a reflection from the ceiling to the photocell 16. If the ceiling is high, the angle of the beam with respect to the line $d$ will be greater. At infinitely high ceiling it will approach 90°. At very low ceiling it will describe an angle between zero and 90°. The reflected light will increase the conductivity of the photocell 16 and the resultant increase in its anode-cathode current flow causes a rise in the potential existing across the phototube load resistor 23. When the increase in illumination subsides, the voltage across resistor 23 decreases. Thus, for a momentary increase in illumination of the photocell 16 as caused by the passage of the scanning light spot, a momentary increase in potential occurs across the resistor 23. This will charge the coupling condenser 20 through the resistor 21 and the charging current will cause the appearance of a potential across this resistor applying to the grid 18 of the amplifier tube 17 a positive impulse. The resultant increase in the plate current of this tube causes an increase in the voltage drop across the load resistor 40 and a consequent decrease in the potential existing between the anode and cathode of this tube. This decrease in potential will discharge the second coupling condenser 57 producing a voltage across the resistor 56 which applies a negative pulse to the grid 48 of the amplifier tube 19. This results in an increase of the potential across the anode load resistor 41. This increase will cause the third coupling condenser 58 to charge through the resistor 69 and the charging current will produce a potential which appears across this resistor and will drive the grids 62 and 63 of the discharge tubes 60 and 61, respectively, in the positive direction with respect to their cathodes.

The increase in the potential across the phototube load resistor 23 is momentary and the amplified form of the voltage increase applied to the grids 62 and 63 of the discharge tubes 60 and 61 appears as an impulse. The magnitude of this impulse is so chosen that it will overcome the bias potential applied to the grids 62 and 63 and initiate instantaneous conductivity in one of the tubes 60 or 61. In view of the fact that once conductivity is initiated, the tubes 60 or 61 will maintain current conductivity, the re-establishment of the bias potential on the grids 62 and 63 after cessation of the impulse will have no effect on the tubes. The conductivity will depend upon the particular voltage relation between the anodes and cathodes. In other words, at one half cycle of the alternating-current wave tube 60 will be conducting, whereas on the second half cycle tube 61 provided that an impulse was received on the grids 62 and 63. The amount of current flow will depend upon the time of the occurrence of the impulse with respect to the cyclic variation of the anode potential. If the impulse occurs at a time when the plate potential is sinusoidally increasing, there will be current conductivity for practically the entire half cycle of anode voltage supply. Current will flow until the voltage is reversed in polarity between the anode and cathode electrodes. In other words, the current will be proportional to the phase angle position of the alternating-anode potential at which the grid of the tube becomes sufficiently positive to initiate current flow. Advance in the phase angle position of the grid impulse with respect to the anode voltage results in an increase in the current, whereas an impulse occurring later, or a retarded impulse with respect to the phase position of the anode voltage will result in a lower anode current.

Bearing in mind the current conductivity and phase relation between impulse on the grids 62 and the instantaneous phase angle of the potential supplied to the anodes 64 or 65 let us see how this depends upon the rotation of the drum 2 and the resultant light impulse. Since the impulse on the grids of the tubes 60 and 61 is derived from the amplifier and the latter produces an impulse only upon excitation of the photocell which, in turn, occurs only when there is a reflected image from the natural ceiling, it will be clear that the occurrence of the impulse in time relation depends upon the height of the ceiling level. When the reflection occurs from a high ceiling, it will be earlier than from a low ceiling. Consequently, the impulse for triggering the conductivity of the tubes 60 and 61 will occur at an advanced phase position from a high ceiling and at a retarded phase position from a lower ceiling. We know that an early impulse will result in more average current than a later impulse. Consequently, the amount of current bears a definite relationship with the height of the ceiling level. This is illustrated in Figs. 4 and 5 which should be observed together. In Fig. 4 under A the reflection from a certain ceiling level is shown to the photocell receiver 12 and the position of the drum 2 indicates the angle of the beam from which reflection occurs. Correspondingly, in Fig. 5 under A is shown the anode potential sine wave for tubes 60 and 61 marked by the curve $E_p$ and the impulse superposed on the grid bias voltage marked $E_g$. The phase relation of the impulse with respect to the phase relation of the anode voltage is shown by the shaded area which denotes also current flow marked $I_p$. The impulse occurred at a time when the voltage wave was receding towards zero resulting in a small average plate current. It should be noted that for each half cycle of plate voltage, there is a corresponding impulse. The reason for this is obvious since a sweep will occur at 120 times per second and each tube, being operative at one half cycle of the 60 cycle voltage wave, will be conductively energized at 120 times per second.

Referring to the position of the reflected image under B in Figs. 4 and 5, it is seen that the impulse occurs earlier in the time phase relation between reflection and the instantaneous position of the anode potential. The shaded area marks the resultant current flow $I_p$. In the third example under C, depicting a higher ceiling and an even earlier reflection, the shaded area is increased considerably resulting in more anode current. The examples A, B and C indicate that as the ceiling level changes, the impulses vary in time occurrence with a constant sinusoidal change of anode potential. Maximum current flow is obtained when the impulses approach in phase relation and minimum current when there is a 90° phase shift between the impulses and the anode voltage.

The meter utilized for indicating current flow can be a simple d'Arsonval type direct-current instrument connected to indicate anode current. The optical scanning angle of the photo-electric system here is 90° but the electrical angle between the positive grid pulses and the anode voltage supply wave is 180°. For practical purposes, the effective producing current of the discharge tubes may be calculated from the following formula:

$$i = \frac{I}{\pi}\left(1 - \frac{d^2 - h^2}{d^2 + h^2}\right)$$

where $i$ is the average current indicated by the meter (full wave), $I$ the peak rectified current (½ wave), $d$ the distance between light source and photo tube receiver and $h$ the ceiling height.

The system herein described provides simple and accurate indication, particularly during the hours between sunset and sunrise when the photocell is illuminated only by the passage of the scanning light spot through the objective area of the housing 12. The system may operate as well during daylight hours provided that the passage of the scanning light spot will give an illumination increase on the photo-tube over the ambient daylight illumination. This is readily accomplished during relatively heavily overcast sky conditions where the ambient light on the photocell is low.

A more accurate daylight operation can be obtained if the photocell housing is provided with a color filter passing only the violet light of the light spectrum. In this case, the photocell would be of the variety sensitive to this particular portion of the spectrum and the light source may be a high intensity mercury vapor lamp or other suitable source rich in the particular range of light spectrum selected. The system will then operate at all times with the exception of periods during which the photocell is subject to considerable direct sunlight or direct moonlight.

I claim as my invention:

1. In a system for continuously indicating the distance of an object having light reflective properties from a fixed point, means at a known distance from said fixed point for sweeping said object with a beam of light in intervals periodically recurring at a fixed periodicity, means at said fixed point for receiving the reflected light impulses, means for converting said light impulses into electric current variations, an electrical circuit including a source of current of periodicity proportional to said fixed periodicity, and current responsive means in said circuit controlled by said current variations.

2. In a system for continuously registering the height of an aviation ceiling above a fixed point, means at a known distance from said fixed point for sweeping said ceiling with a beam of light at predetermined and uniform time intervals, means at said fixed point for receiving the resultant reflected light impulses, means to convert said light impulses into electric current impulses, an electrical circuit energized from a source of current of a periodicity proportional to the periodicity of said received impulses, means for controlling the current in said circuit in accordance with said electrical current impulses, and means responsive to the magnitude of said current.

3. In a system for continuously indicating the distance of an object having light reflective properties from a fixed point, means located at one point for sweeping said object with a beam of light in intervals recurring at a fixed frequency, means located at another point at a known distance from said first mentioned point for receiving the reflected light impulses, means for converting said light impulses into electric current variations, an electrical circuit including a source of current of a proportional to said fixed frequency, means in said circuit to control current flow, circuit means energized by said current variations for controlling said control means in accordance therewith, and means for indicating the resultant current in said electrical circuit in terms of said known distance.

4. In a system for continuously indicating the varying height of cloud and fog banks forming a natural ceiling, a light source, a projector therefor comprising a revolving drum having apertures so oriented as to project the light in a vertical plane sweeping the sky in uniformly recurrent intervals, means for rotating said drum at a substantially constant speed resulting in a predetermined number of sweeps per unit time, means located at a known distance from said projector for receiving the light reflected from said ceiling including a photoelectric cell for converting said light impulses into electrical current variations, an output circuit for said cell including a pair of electron discharge devices having anode, cathode and control electrodes, said discharge devices being of a type wherein the control electrode functions solely to initiate space current conductivity, circuit means for applying said electrical current variations to said control electrodes, a source of potential having a predetermined period proportional to said recurrent intervals connected between cathodes and anodes of said devices, whereby space current conductivity in said devices is effective at alternate half cycles of said frequency and an indicator for said space current.

5. In a system in accordance with claim 4, wherein said number of sweeps in unit time is an even multiple of the frequency of said potential.

6. In a system in accordance with claim 4, wherein said means for rotating said drum comprises a synchronous motor drawing current from said source of potential.

SLAVO J. MURCEK.